United States Patent [19]
Kelley et al.

[11] Patent Number: 5,996,480
[45] Date of Patent: Dec. 7, 1999

[54] APPARATUS FOR ROASTING COFFEE BEANS

[75] Inventors: Alan R. Kelley, Barrington, Ill.; J. R. Kim, Seoul, Rep. of Korea; Jay S. Moon, Buffalo Grove; Daryl Osberg, Palatine, both of Ill.

[73] Assignee: Hearthware Home Products, Inc., Wheeling, Ill.

[21] Appl. No.: 09/134,324

[22] Filed: Aug. 14, 1998

[51] Int. Cl.⁶ ............................ A23N 12/00; A47J 27/026; A47J 31/42; A47J 42/52
[52] U.S. Cl. .............................. 99/468; 99/286; 99/323.7; 99/469; 99/476; 99/483; 34/233; 34/360; 34/576; 34/594; 219/400; 219/385; 366/101; 366/107; 366/144; 366/165.2
[58] Field of Search ..................... 99/286, 357, 467–469, 99/473–476, 483, 516, 518, 525, 600, 601, 609–611, 323.5–323.9; 34/233, 533, 594, 576, 225, 267, 360, 609, 136, 560, 181, 589, 68; 366/101, 144, 107, 145, 165.1, 165.2; 219/385, 386, 389, 400; 241/65, 100; 426/466, 467; 392/379

[56] References Cited

U.S. PATENT DOCUMENTS

| | | | |
|---|---|---|---|
| 4,425,191 | 1/1984 | Kimagai et al. | 99/286 X |
| 4,425,720 | 1/1984 | Elevitch | 219/400 X |
| 4,455,763 | 6/1984 | Elevitch | 34/233 |
| 4,484,064 | 11/1984 | Murray | 99/474 X |
| 5,500,237 | 3/1996 | Gell, Jr. et al. | 426/466 |
| 5,564,331 | 10/1996 | Song | 99/469 |
| 5,573,802 | 11/1996 | Porto | 34/360 X |
| 5,579,679 | 12/1996 | Hsu | 99/483 X |
| 5,609,097 | 3/1997 | Newnan | 99/483 X |
| 5,638,607 | 6/1997 | Lemme et al. | 219/385 X |
| 5,718,164 | 2/1998 | Finken et al. | 99/476 X |
| 5,735,194 | 4/1998 | Cochran | 99/323.5 |
| 5,749,288 | 5/1998 | Skaling | 99/483 |

*Primary Examiner*—Timothy F. Simone
*Attorney, Agent, or Firm*—Wood, Phillips, VanSanten, Clark & Mortimer

[57] ABSTRACT

An improved apparatus for roasting raw coffee beans includes a main housing (10) having an air inlet (24). A blower assembly (18,20,22) is disposed within the housing (10) and is in fluid communication with the inlet (24). The blower assembly has a discharge location (32) whereat an electric heater (34) is located. A coffee bean receiving vessel (12) is removably mounted on the main housing (10) and in turn, a hull collector (14) disposed on the vessel (12). A control (FIG. 3), including a sensor (38,136), is located in the air stream upstream of the inlet (56,58) to the vessel (12) and downstream of the electric heating element (34).

16 Claims, 2 Drawing Sheets

APPARATUS FOR ROASTING COFFEE BEANS

FIELD OF THE INVENTION

This invention relates to apparatus for roasting coffee beans, and more specifically, to a relatively small coffee bean roaster, particularly suited for use in the home.

BACKGROUND OF THE INVENTION

Recent years have seen an explosion of interest in gourmet coffee products and the interest has not been limited to the purchase of coffee-based beverages from vendors who prepare the beverage on premise and purvey it to consumers over the counter. Similarly, the interest has not been limited to gourmet blends, coffee that may be purchased already ground, and then brewed in the home. Many consumers desire the ultimate in freshness and flavor and have taken to roasting their own beans and then grinding them shortly before the coffee brewing process is initiated.

As a consequence, an increasing market for coffee roasting apparatus that may be used in the home has sprung up. A variety of coffee roasting apparatus have been devised to meet this market. One example of such a coffee roasting apparatus is illustrated in U.S. Pat. No. 5,564,331 issued Oct. 15, 1996 to Song, the entire disclosure of which is herein incorporated by reference. The apparatus works well for its intent and purpose, but further improvement is required to meet the increasingly demanding tastes of coffee beverage consumers.

Coffee roasting is a two-step process. The outside of a bean is covered with a husk which also follows a fold into the center of the bean. As it is roasted, the coffee bean expands and literally "pops" to shed the outer husk. If the bean is properly roasted, the center of the bean further expands and allows some of the internal husk to break free of the bean. Removal of the husk considerably improves the flavor of the coffee.

Desirably, coffee beans are roasted in a heated air stream and there is a delicate balance of temperature and air flow required to properly roast the bean. Optimal roasting allows convective heat from the air stream to easily penetrate the husk and cause the internal mass of the bean to quickly rise to a desired temperature. This causes moisture and oil within the bean to vaporize and expand to apply pressure to the husk, resulting in the popping of the bean. The mass of the bean expands and the husk is freed from the bean.

If a bean is roasted at too low of a temperature, the moisture build-up is sufficiently slowed as to allow the vapor to escape without building up sufficient pressure to pop the bean. When this occurs, the bean will be of smaller size than if proper roasting occurs. Some of the husk on the exterior of the bean may remain and most of the husk on the interior of the bean will likewise remain in place. On the other hand, if a bean is roasted at too high of a temperature, the bean will be burned, i.e., overly caramelized, and taste will suffer. In some cases, high temperature roasting will result in a burning of the husk. As the husk serves as a moisture barrier to allow pressure to build up during roasting, the burning of the husk destroys the moisture barrier and allows the moisture to escape without building up sufficient pressure to pop the bean.

The second stage of roasting occurs once the bean pops. Here, the heating of the oil within the bean results in chemical changes to roast the bean to the taste of a particular consumer. In many instances, continued roasting of the bean after popping causes a further expansion of the bean.

To achieve optimum roasting, it is necessary that the beans be uniformly heated. If the heating is not uniform, some of the beans may pop early in the roasting process and others, not at all. Consequently, uniform flavor cannot be obtained.

Similarly, it is necessary that roasting temperature be properly controlled to assure maximum husk removal, as well as proper flavor development which cannot occur if the roasting temperature is either too low or too high.

Heretofore, coffee bean roasters intended for home use have generally subjected the beans to a heated air stream for a period of time selected by the consumer who is operating the roaster. This does not provide adequate temperature control because of many variables involved.

Specifically, a small quantity of beans to be roasted will attain a desired roasting temperature in a lesser amount of time than a larger quantity of beans with the result that the roasts of the two quantities will be quite different.

Secondly, in a typical home coffee bean roaster, wherein a heated air stream is passed through beans in a vessel, a greater quantity of beans will impede air flow through the beans more than if a lesser quantity of beans were present. As a consequence of the impeded air flow, the residence time of the air in the heating instrumentality will increase with the result that the air stream passing through the beans will be of a higher temperature when the quantity of beans is large as compared to when it is small.

Most home coffee bean roasters also include some sort of means for capturing the separated husks as they separate from the body of the bean during the roasting process. Obviously, more husks will separate when a larger quantity of beans are present, and since the separating process typically employs a filter, such as a fine mesh screen, to capture the husks, the build-up of husks on the screen will be greater for a large quantity of beans than for a smaller quantity. This husk build-up will also impede air flow through the beans, with the consequence that the beans will be subjected to a higher temperature air stream.

Another significant factor is line voltage. Typical home coffee bean roasters are electrically operated, i.e., the heating instrumentality is an electrical resistance heater. Due to differences in service location, electrical loading of the home electrical system as when other electrical appliances are operating or turned off, or simply due to fluctuations in line voltage as a result of transitory conditions within an electrical distribution system for a wide area, line voltage will not untypically vary from 105 volts up to 130 volts or more on a line intended to provide a 120 volt alternating current. When low voltage conditions occur, the heat up of the electrical heating element used to heat the air stream will be slower than would be the case under normal voltage conditions which, in turn, would be slower than would be the case for high voltage situations. As a consequence, line voltage fluctuations have a significant effect on the temperature of the air stream applied to the beans in the roaster and, of course, on the outcome of the roasting process. Low voltage conditions can thus result in an under-roast, including inadequate hull popping, while high voltage conditions can result in over-roasting, including burning or over-caramelizing of the beans to be roasted.

The present invention is directed to overcoming one or more of the above problems.

SUMMARY OF THE INVENTION

The principal object of the invention is to provide a new and improved coffee bean roasting apparatus, particularly suited for home use. More specifically, it is an object of the invention to provide such a coffee roasting apparatus that provides improved control of the temperature of the roasting air stream, as well as enhanced mixing and tumbling of the coffee beans during the roasting process to improve uniformity of the roast.

According to one facet of the invention, an exemplary embodiment of an apparatus for roasting coffee beans includes a main housing having an air inlet and a blower assembly within the housing, and in fluid communication with the inlet. The blower assembly has a discharge location and an electric heater is within the housing at the discharge location. A coffee bean receiving vessel is removably mounted on the housing and has an air inlet located to receive a stream of air blown by the blower assembly and heated by the heater, along with an outlet spaced from the vessel inlet. A hull collector is connected to the vessel outlet for receiving hulls of coffee beans in the vessel and entrained in the air stream and a control is provided for the heater that includes a sensor located in the air stream upstream of the vessel inlet and downstream of the electric heater to provide temperature control.

In a preferred embodiment, the control is operative to terminate operation of the heater when the sensor determines a first predetermined temperature exists and to energize the heater at a temperature at or below a second predetermined temperature less than the first predetermined temperature.

In one embodiment, the apparatus further includes a timer for enabling the control for predetermined times.

In one embodiment of the invention, the sensor includes a thermistor.

A highly preferred embodiment of the invention has a control that is operative to cause the air stream to be heated to a first predetermined elevated temperature sufficient to pop the hulls of the coffee beans and thereafter to heat the air stream to a second predetermined elevated temperature somewhat less than the first predetermined elevated temperature to roast the coffee beans.

In one embodiment of the invention, the second predetermined elevated temperature is an average temperature.

In one embodiment of the invention, the sensor is a thermistor and the control includes a switch connected in series with the electric heater and an electronic circuit for operating the switch and responsive to the thermistor.

According to another facet of the invention, an apparatus for roasting coffee beans includes means for directed heated air through a vessel adapted to contain coffee beans to be roasted and which has a generally lower inlet for introducing a heated air stream in a generally cyclonic flow and a generally upper outlet. The vessel has a peripheral wall extending between the upper outlet and the lower inlet which is a surface of revolution and has an inner surface provided with a plurality of spaced, radially inwardly directed, annular ribs to enhance mixing and tumbling of the coffee beans in the vessel in the heated air stream therein.

In one embodiment, the ribs are adjacent the inlet.

In one embodiment, at least one of the ribs is generally about midway between the inlet and the outlet.

Preferably, at least one of the ribs is adjacent the inlet and another of the ribs is generally about midway between the inlet and the outlet.

According to another facet of the invention, apparatus for roasting coffee beans is provided and includes a means for generating a heated air stream and a vessel for containing coffee beans to be roasted and receiving the heated air stream to roast the beans. The vessel has a lower wall in the form of a shallow cone with an apex extending into the vessel and is provided with an inlet for an air stream. The inlet causes the air stream to move within a cyclonic path within the vessel. The invention contemplates the improvement wherein the vessel has a generally vertical center line and the apex is displaced to one side of the center line to enhance mixing and tumbling of the coffee beans within the vessel to improve the uniformity of the roast.

Other objects and advantages will be apparent from the following specification taken in connection with the accompanying drawings.

DESCRIPTION OF THE PREFERRED EMBODIMENT

Figure 1:
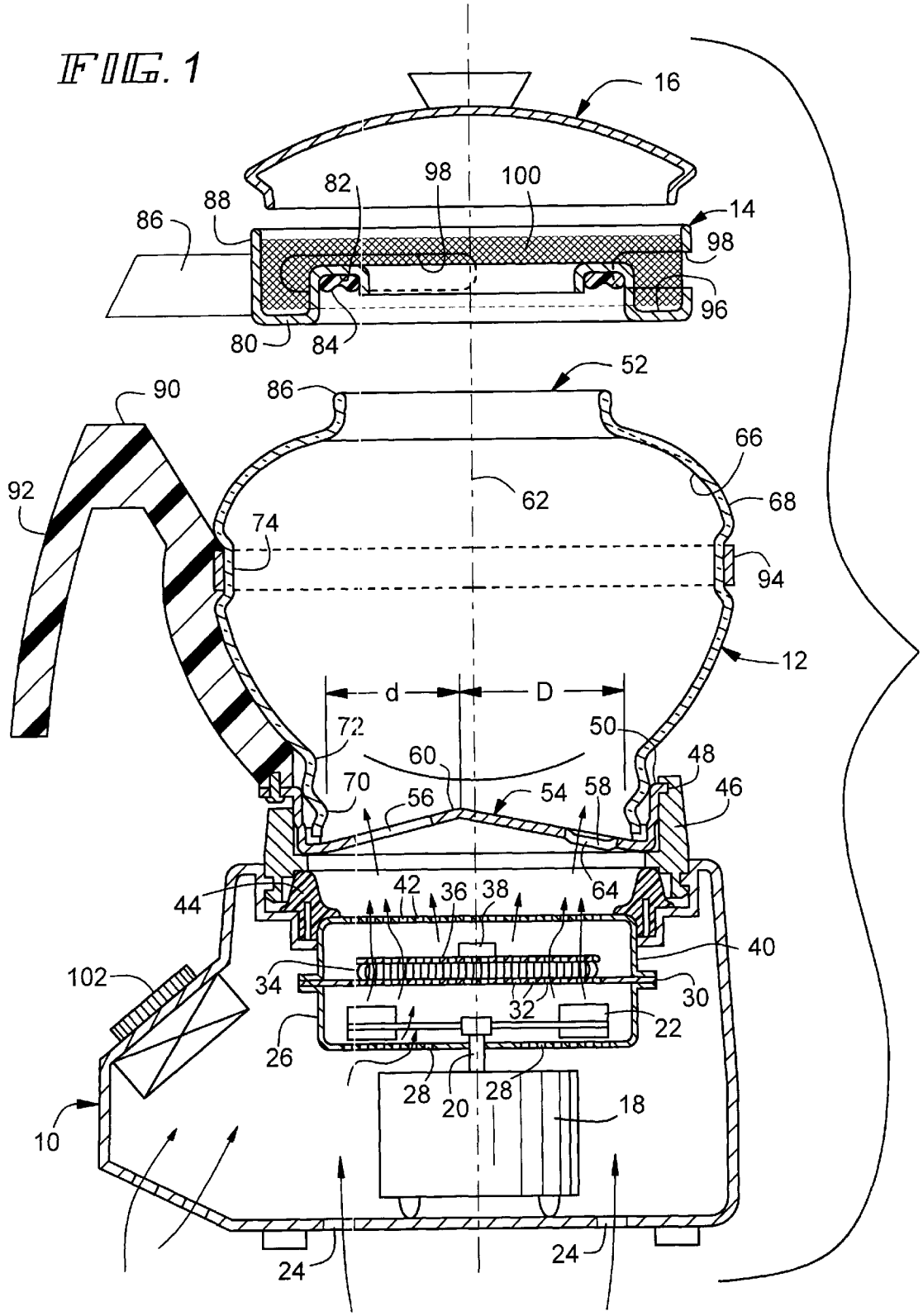
FIG. 1 is an exploded, sectional view of a coffee roaster made according to the invention.

An exemplary embodiment of a coffee bean roasting apparatus made according to the invention is illustrated in FIG. I and is seen to include four major components, including a base or main housing 10, removably supporting a coffee roasting vessel, generally designated 12. At the upper end of the coffee roasting vessel 12, a hull receiver or collector, generally designated 14, is located. The hull receiver 14, in turn, removably receives a cover, generally designated 16.

The main housing 10 is generally as described in the previously identified Song patent and includes an electrical motor 18 having an output shaft 20 which in turn mounts an impeller 22. The main housing 10 includes a series of air inlet openings 24 in its underside.

The impeller 22 is located in a cup-shaped element 26 having intake openings 28 through which air may flow from the openings 24 in the main housing 10 to the impeller 22.

Just above the impeller 22, a mica sheet 30 with a series of apertures 32 mounts a circular, electrical resistance heating element 34. The heating element 34 is, in turn, held in position on the mica sheet 30 by an additional mica sheet 36. A temperature sensor 38, preferably in the form of a thermistor is centrally mounted on the mica sheet 36 on the side thereof opposite the resistance element 34 and thus, in the path of air flow, is downstream of the heating element 34 and upstream of the roasting vessel 12.

The resistance element 34, the sensor 38, and the impeller 22 are enclosed in an assembly including the cup-shaped element 26 along with a second, inverted cup-shaped element 40 which is secured to the mica sheet 20 and to the cup shaped element 28 by any suitable means. The cup-shaped element 40 includes a series of apertures 42 through which air heated by the element 34 may be discharged upwardly. In the usual case, the openings 42 may be in the form of a plurality, typically six, louver-shaped openings which are equally angularly spaced about the cup-shaped element 42 and which open in the same angular direction so as to generate a cyclonic air flow.

A high temperature sealing element 44 located in the upper end of the main housing 10 abuts the cup-shaped element 40 about its periphery.

A ring-shaped, vessel mounting member 46 is located just above the sealing element 44 and is secured to the housing 10 in any suitable fashion. As more fully described in the previously identified Song patent, the ring-shaped element 46 includes a plurality of slots 48 for receiving radially outwardly directed tabs 50 on the vessel 12 whereby the vessel may be located in the position illustrated in FIG. 1 and twisted to cause the tabs 50 to enter the slots 48 to retain the vessel 12 on the main housing 10. By reversing the twisting motion, the tabs 50 can be moved out of the slots 48 so that the vessel 12 may be lifted from the main housing 10.

The vessel 12 is preferably made of heat-resistant glass and includes an upper outlet, generally designated 52, and a lower wall, generally designated 54, having louvered inlet openings 56,58 therein. The wall 54 is preferably formed of metal and is shaped as a shallow cone having an apex 60 extending into the vessel 12 as seen in FIG. 1. An important feature of one facet of the invention is that the apex 60 is displaced from the vertical center line 62 of the vessel 12. That is to say, along one diameter of the vessel 12, the wall 54 has the apex 60 spaced from one edge of the interior of the vessel by the Distance "D" and from a diametrically opposite edge, by a lesser distance "d".

Figure 2:
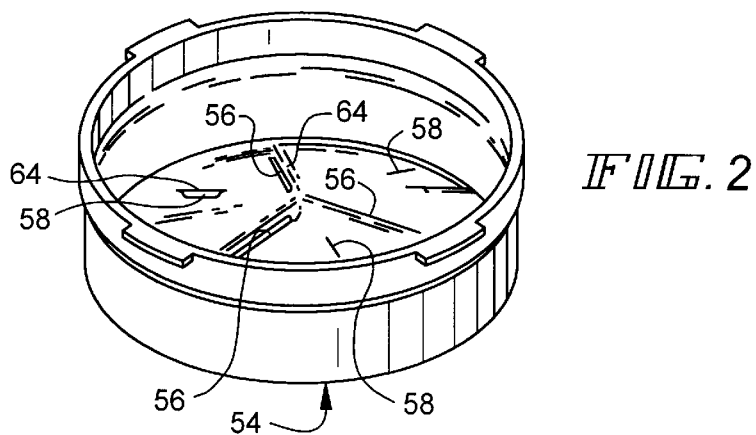
FIG. 2 is a perspective view of a bottom wall of a roasting vessel employed in the coffee roaster.

As seen in FIG. 2, the openings 56 are relatively long in comparison to the openings 58 with the openings 56 and 58 being staggered in alternating fashion and an equally angularly spaced relation. Each of the openings is defined by a displaced piece of the metal of which the bottom wall 54 is formed, i.e., a louver 64, and each of the louvers 64 opens in the same angular direction within the vessel 12. Thus, heated air may enter the vessel 12 through the inlets provided by the openings 56 and 58 and be directed circumferentially therein to generate a cyclonic, heated air stream within the vessel 12.

The interior wall 66 of the vessel 12, and typically the outer wall 68, as well, will be formed as a surface of revolution about the vertical center line 62.

Adjacent the inlet to the vessel 12 provided by the openings 56,58, the vessel contains annular, radially inwardly directed, peripheral, spaced ribs with a lowermost one of the ribs designated 70 and an uppermost one of the ribs designated 72. Further, approximately midway between the inlet defined by the openings 56,58 and the outlet 58, a further peripheral, radially inward directed, annular rib 74 is provided.

Both the displaced apex 60 and the annular ribs 70, 72 and 74 improve mixing and tumbling action of coffee beans within the cyclonic air stream within the vessel 12. In particular, in the circumferential direction, as the beans move around the apex 60, they become more crowded on the side designated "d" of the apex 60 and in order to maintain their velocity as a result of momentum, the crowding results in an improved tumbling and mixing action. In the vertical direction, as the beans tumble and mix circumferentially, they are forced upwardly as a result of the crowding, and they encounter the ribs 70, 72 and 74 which cause them to tumble further within the vessel 12 which in turn results in improved mixing. As a consequence of this construction and the improved tumbling and mixing provided thereby, a much more uniform roast is obtained.

The hull receiver 14 includes a bottom wall 80 provided with a downwardly opening, radially inner, downwardly facing, annular notch 82. A seal 84 is located in the notch 82 and is adapted to snugly fit and seal against the peripheral edge 86 of the outlet 52 of the vessel 12. A handle 86 is provided on the radially outer peripheral wall 88 of the hull receiver 14 and, as described in the Song patent, may be constructed so as to nest on the upper end 90 of a handle 92 secured to the vessel 12 by a strap 94 extending about the vessel 12 on the exterior in the vicinity of the rib 74.

The foregoing construction of the hull receiver 14 results in a peripheral trough 96 in which hulls may be received. The peripheral wall 88 is provided with a series of openings 98 which are covered by a filter in the form of a fine mesh screen 100 to prevent the hulls from exiting the hull receiver 14. The open top of the hull receiver 14 is, of course, closed by the cover or lid 16.

Thus, the hot air stream may exit the vessel 12 through the outlet 52 to enter the hull catcher 14. Centrifugal force will cause the hulls to move radially outwardly and settle within the trough 96 with the air exiting the assembly via the openings 98. The fine mesh screen 100 retains the hulls within the hull catcher.

It is to be particularly noted that the outlet 52 of the vessel 12 is narrowed at its interface with the hull receiver 14. This provides a venturi-like action so that the air stream entering the hull receiver 14 is at high velocity to maximize the centrifugal force applied to the hull at this point. Once the hulls have entered the hull receiver 14, they are free to move radially outwardly and as the velocity slows as a consequence, drop out of the air stream to be collected in the trough 96.

Figure 3:
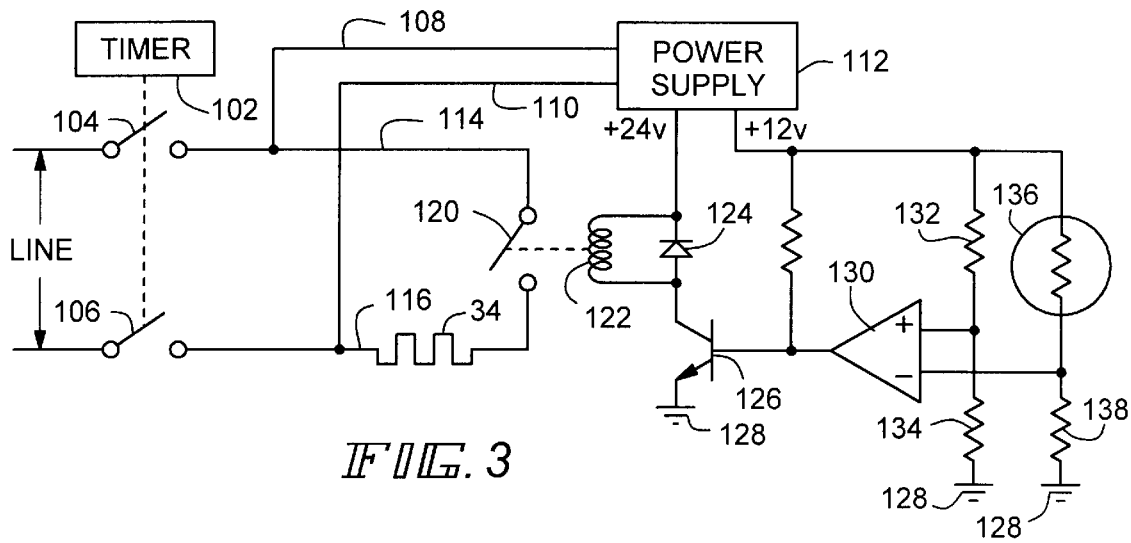
FIG. 3 is a schematic of a control and sensor circuit employed in the coffee roaster.

Turning now to FIG. 3, a control and sensor circuit for the coffee bean roaster will be illustrated. The same may include a timer 102 of conventional construction operating a pair of switch contacts 104,106 that may be placed across the line of a source of alternating current or the like. The timer 102 may be mounted on the main housing 10 as illustrated in FIG. 1.

From the timer and its contacts 104,106, power is taken via lines 108,110, to a conventional power supply 112 which provides DC power at a relatively low voltage sufficient to operate electronic components.

In electrical parallel with the lines 108,110 are lines 114,116 which extend to the serial combination of the electrical resistance heater 34 and relay contacts 120 operated by a relay coil 122. If desired, however, the relay defined by the contacts 120 and the coil 122 could be replaced by a high power semiconductor switch.

The relay coil 122 has a diode 124 connected across it and the combination thereof is connected in series between the power supply 112 with a transistor 126 to ground 128. Conduction of the transistor 126 is controlled by the output of a comparator 130 such that when the transistor 126 is conducting the coil 122 will be energized to close the contacts 120 and energize the electrical resistance heater 34. Of course, for such to occur, the timer 102 must be manually turned on to enable the control circuits.

The comparator 130 receives one input from a voltage divider made up of resistors 132 and 134 connected between the power supply 112 and ground 128. Resistors 132 and 134 are chosen to set the set point of the comparator 130.

A second input to the comparator 130 is received from a voltage divider made up of a thermistor 136 and a resistor 138, also connected between the power supply 112 and ground 128.

As is well known, the thermistor is a variable resister whose resistance varies linearly with temperature, over a particular range. Consequently, the thermistor 136 serves as the sensor 38 shown in FIG. 1.

In the usual case, the values for the resistors are selected so that the transistor 126 will be conducting whenever the temperature at the sensor 38 initially has not yet reached about 250° C. When that temperature is reached, the voltage applied to the comparator 130 from the voltage divider including the thermistor 138 will be sufficiently different from that applied by the set point voltage divider made up of the resistors 132,134 that the transistor 126 will cease to conduct, thereby allowing the relay contacts 120 to open.

More customized control to suit the wishes of the individual user of the apparatus can be obtained by suitably adjusting the timer 102 to increase or decrease the length of the roasting cycle.

Figure 4:
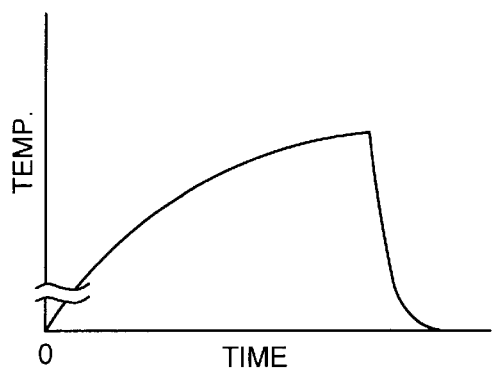
FIG. 4 is a plot of time against temperature for one operating condition of the circuit shown in FIG. 3.

FIG. 4 illustrates a typical mode of operation where relatively low line voltage is encountered. In such a case, temperature rise will be relatively slow and the electrical heating element 34 will be energized for the full length of time set on the timer 102.

Figure 5:
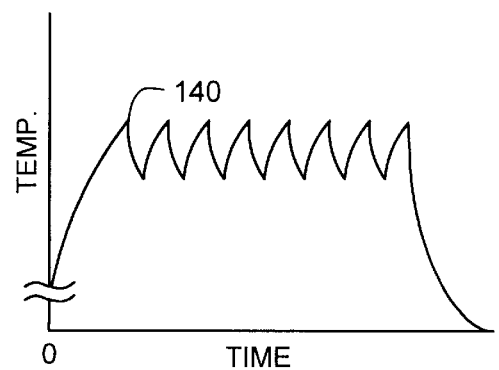
FIG. 5 is a plot similar to FIG. 4 but illustrating the relationship between time and temperature for another operating condition of the circuit of FIG. 3.

FIG. 5 illustrates the situation where line voltage is relatively high. In this case, the peak temperature will be reached relatively quickly, at which time the thermistor 136 will cause the control circuit to terminate operation of the heater. The temperature will begin to drop to a second temperature less than the peak temperature. The second temperature can be set at any desired level by appropriate selection of the sensitivity of the comparator 130. When this temperature is reached, typically about 200° C., the thermistor 136 will again sense that occurrence with the ultimate result that the heater 34 will again be energized. The cycle will repeat itself until the timer 102 times out.

For normal voltage conditions, a curve having fewer spikes than that illustrated in FIG. 5 will exist. Preferably, the resistance values are chosen so that after initial peak is reached, such as shown at a point 140 in FIG. 5, the arrangement is such that a second elevated temperature, somewhat less than the peak temperature, will be basically maintained. This temperature will, of course, be an average temperature for the type of circuit shown and preferably will be about 230° C. As a consequence, in normal operation, the circuit will rapidly cause the peak temperature to be obtained to cause a quick and uniform popping of the beans. Thereafter, the beans will be roasted at a somewhat lesser temperature, the average temperature produced by the circuit which is mentioned above, is preferably about 230° C.

From the foregoing, it will be seen that a raw coffee bean roasting apparatus made according to the invention provides considerable advantages over those heretofore known for home use. For one, good temperature control during the roast is obtained with a very inexpensive control circuit. Under normal circumstances, a highly desirable initially relatively high temperature sufficient to pop the beans is obtained followed by a lowering of the average temperature to obtain a desired roast. Unlike prior art devices, the roasting cycle is controlled both by temperature and by time, thereby putting a greater control in the hands of the users.

The unique displacement of the apex 60 of the lower wall 54 of the roasting vessel 12 provides improved mixing and tumbling as does the presence of the ribs 70, 72 and 74. Consequently, a much more uniform roast, and the advantages attendant the same, are realized through use of the invention.

We claim:

1. Apparatus for roasting raw coffee beans comprising:
   a main housing having an air inlet;
   a blower assembly within said housing and in fluid communication with said inlet, said blower assembly having a discharge location;
   an electric heater within said housing at said discharge location;
   a coffee bean receiving vessel removably mounted on said housing and having an inlet located to receive a stream of air blown by said blower assembly and heated by said heater and an outlet spaced from said vessel inlet;
   a hull collector connected to said vessel outlet for receiving hulls of coffee beans in said vessel entrained in said air stream; and
   a control for said heater including a sensor located in said air stream upstream of said vessel inlet and downstream of said electric heater.

2. The apparatus of claim 1 wherein said control is operative to terminate operation of said heater when said sensor determines a first predetermined temperature exists and to energize said heater at a temperature at or below a second predetermined temperature less than said first predetermined temperature.

3. The apparatus of claim 2 further including a timer for enabling said control for predetermined time periods.

4. The apparatus of claim 2 wherein said sensor comprises a thermistor.

5. The apparatus of claim 1 wherein said control is operative to cause said air stream to be heated to a first predetermined elevated temperature sufficient to "pop" the hulls of the coffee beans and thereafter to heat the air stream to a second predetermined elevated temperature somewhat less than said first predetermined elevated temperature to roast the coffee beans.

6. The apparatus of claim 5 wherein said second predetermined elevated temperature is an average temperature.

7. The apparatus of claim 6 wherein said sensor is a thermistor and said control includes a switch connected in series with said electric heater and an electric circuit for operating said switch and responsive to said thermistor.

8. In an apparatus for roasting coffee beans including means for directing heated air through a vessel adapted to certain coffee beans to be roasted and having generally a lower inlet for introducing a heated air stream in a generally cyclonic flow and a generally upper outlet, the improvement wherein said vessel has a peripheral wall extending between said upper outlet and said lower inlet which has an inner surface provided with a plurality of spaced, radially inwardly directed annular ribs to enhance mixing and tumbling of coffee beans in the vessel in the heated air stream therein.

9. The apparatus of claim 8 wherein said ribs are adjacent said inlet.

10. The apparatus of claim 8 wherein at least one of said ribs is generally about midway between said inlet and said outlet.

11. The apparatus of claim 8 wherein said wall is a surface of resolution at least one of said ribs is adjacent said inlet and other of said ribs is generally about midway between said inlet and said outlet.

12. The apparatus of claim 8 wherein said inlet includes an apertured wall of said vessel generally at the lower end of said vessel in the form of a shallow cone having an apex extending into the vessel at a location displaced from the centerline of said vessel to enhance mixing and tumbling of coffee beans within said vessel and in said heated air stream.

13. In an apparatus for roasting coffee beans including means for generating a heated air stream and a vessel for containing coffee beans to be roasted and receiving said heated air stream to roast the beans therein and having a lower wall in the form of a shallow cone with an apex extending into the vessel and provided with an inlet for the air stream and causing the same to direct the air stream in a cyclonic path within the vessel, the improvement wherein said vessel has a generally vertical centerline and said apex is displaced to one side of said centerline to enhance mixing and tumbling of the coffee beans within the vessel.

14. The apparatus of claim 13 wherein said vessel has an interior wall joining said lower wall and which is a surface of revolution about said centerline, and further including a plurality of spaced annular, peripheral, radially inwardly directed ribs to enhance mixing and tumbling of coffee beans in the heated air stream within the vessel.

15. The apparatus of claim 14 wherein said ribs are adjacent said inlet.

16. The apparatus of claim 14 wherein said vessel has an upper outlet and at least one of said ribs is about midway between said inlet and said outlet.

* * * * *